United States Patent
Dondini et al.

(10) Patent No.: US 8,527,573 B2
(45) Date of Patent: Sep. 3, 2013

(54) DEVICE FOR COMPUTING QUOTIENTS, FOR EXAMPLE FOR CONVERTING LOGICAL ADDRESSES INTO PHYSICAL ADDRESSES

(75) Inventors: Mirko Dondini, Catania (IT); Amedeo La Scala, Caltanissetta (IT)

(73) Assignee: STMicroelectronics S.R.L., Agrate Brianza (MB) (IT)

( * ) Notice: Subject to any disclaimer, the term of this patent is extended or adjusted under 35 U.S.C. 154(b) by 543 days.

(21) Appl. No.: 12/876,329

(22) Filed: Sep. 7, 2010

(65) Prior Publication Data

US 2011/0060786 A1    Mar. 10, 2011

(30) Foreign Application Priority Data

Sep. 8, 2009  (IT) .......................... TO 2009 A 0689

(51) Int. Cl.
*G06F 7/52*   (2006.01)

(52) U.S. Cl.
USPC ........................... 708/650; 708/490; 708/504

(58) Field of Classification Search
None
See application file for complete search history.

(56) References Cited

U.S. PATENT DOCUMENTS

| | | | | |
|---|---|---|---|---|
| 3,039,691 A | * | 6/1962 | Fleming, Jr. et al. | 708/653 |
| 3,541,317 A | | 11/1970 | Freiman et al. | 235/164 |
| 4,688,186 A | * | 8/1987 | Ferrell et al. | 708/653 |
| 4,989,173 A | * | 1/1991 | Kaneda | 708/653 |
| 5,315,540 A | | 5/1994 | Lawless | 364/764 |
| 5,862,059 A | | 1/1999 | Matula et al. | 364/718.01 |
| 5,945,657 A | * | 8/1999 | Kozai | 235/462.01 |

FOREIGN PATENT DOCUMENTS

WO    02/077795    10/2002

* cited by examiner

*Primary Examiner* — Michael D Yaary
(74) *Attorney, Agent, or Firm* — Allen, Dyer, Doppelt, Milbrath & Gilchrist, P.A.

(57) ABSTRACT

A device for calculating the quotient q and remainder r of the division $(y \cdot k_1 + x)/k_2$, wherein $k_1$ and $k_2$ are integers and constant, and wherein x and y are integers. The device comprises a first digital circuit for receiving as input values of y and identifying corresponding values of the quotient $q_y$ and the remainder $r_y$ of the function $y \cdot k_1/k_2$, a second digital circuit for calculating the remainder r of the division, by a) calculating a combined value $(x+r_y)$ of the remainder $r_y$ and the value of x, b) verifying if the combined value $(x+r_y)$ is less than $k_2$, c) correcting the combined value $(x+r_y)$ if the verification indicates that the combined value $(x+r_y)$ is not less than $k_2$, and d) assigning the corrected combined value $(x+r_y)$ to the remainder r, a third digital circuit for calculating the quotient q of the division, by a) correcting the quotient $q_y$ if the verification (2206) indicates that the combined value $(x+r_y)$ is not less than $k_2$, and b) assigning the corrected quotient $q_y$ to the quotient q.

18 Claims, 3 Drawing Sheets

DEVICE FOR COMPUTING QUOTIENTS, FOR EXAMPLE FOR CONVERTING LOGICAL ADDRESSES INTO PHYSICAL ADDRESSES

FIELD OF THE INVENTION

The present description regards computation of quotients. The description has been developed with a view to its use for computing quotients during conversion of a logical-address space (for example, of a display) into a physical-address space and (for example, of a memory).

BACKGROUND OF THE INVENTION

Applications such as Systems On Chip (SoCs) or Application-Specific Integrated Circuits (ASICs) frequently use a function for mapping of the addresses of a memory to carry out a conversion from a logical-address space addresses to a physical-address space.

For example, specific applications may desire a predetermined logical-address space, such as logical rows and columns, which are defined during specification of the block. However, the physical-address space may be different on account of limitations during design of the chip layout. These may, for example, be limitations on the ratio between the width and the height of the memory, which is one of the significant factors during definition of the "floorplan" of the integrated circuit to enable determination of the total area of the integrated circuit.

To enable a re-use of one and the same block in various different applications, it is hence useful to develop a generic digital block (also referred to frequently as "Intellectual Property core" or "IP core"), which comprises a standard memory interface. In this case, an additional block is used, which is responsible for conversion of the logical addresses into real physical addresses.

For instance, a possible sphere of application can be a small drive unit for a display, where the drive unit has the task of reading the video data from a RAM for driving the respective pixels of the display. However, the ratio between the width and the height of the memory and of the display are not usually correlated. For example, the display may have a size of 220×176 pixels, while the memory has a size of 480×82. This is also highlighted in FIG. 1, which shows an example of a row R in the logical-address space LAS in a respective portion P into the physical-address space PAS.

In general, to enable a read and/or write access, the conversion block translates the logical address into the physical address of the memory with the following mathematical relations:

$$q(x, y) = \text{quotient}\left(\frac{y \cdot k_1 + x}{k_2}\right) \quad (1)$$

$$r(x, y) = \text{remainder}\left(\frac{y \cdot k_1 + x}{k_2}\right) \quad (2)$$

where $k_1$ is the number of the (logical) columns of the display, $k_2$ is the number of the (physical) columns of the RAM, (x,y) is the location on the display (i.e., the logical address), and (q, r) is the location in the memory (i.e., the physical address), where q is the quotient, and r is the remainder of the division.

The mathematical relation hence represents conversion from the two-dimensional space (x,y) into the two-dimensional space (q, r), i.e., translation of the logical space into the physical space. In general, the constants $k_1$ and $k_2$ can be any integer being greater than two.

FIG. 2 shows a block diagram of an example of possible implementation of Eqs. (1) and (2). In particular, provided in this implementation are a multiplier 102 and an adder 104 that compute the relation ($y \cdot k_1 + x$). The result of the addition is sent to a block 106, for example a divider, which yields the quotient q and the remainder r of the division ($y \cdot k_1 + x$)/$k_2$.

This circuit thus enables conversion of logical address by specifying the parameters $k_1$ and $k_2$. This approach presents significant disadvantages in terms of performance (for example, in terms of maximum delay) and occupation of area of silicon, however.

It is likewise noted that, in some particular cases, it is possible to exploit the properties of the constant $k_1$ and $k_2$ to optimize the operations of multiplication and/or division at the bit level. For example, if the value of $k_1$ and/or $k_2$ is a multiple of 2, the operations of multiplication and/or division can be implemented via a simple shift operation. In particular cases, this behaviour can be exploited for implementing a dedicated "wrapper", i.e., a combinational circuit, for example implemented within an ASIC, which enables direct conversion of a logical address into a physical address.

This is possible if there exists a simple relation between the constant $k_1$ and $k_2$ (for example, when $k_1$ is a multiple of $k_2$). However, in general these optimizations are not possible and, to speed up the circuit, there frequently remains the use of a structure of the pipeline type, which calls for a complex control structure and hence additional area of silicon.

SUMMARY OF THE INVENTION

The object of the invention is to provide an approach for the translation of logical addresses into physical addresses and that is generally applicable for any value of $k_1$ and $k_2$ and with improved performance (for example, in terms of occupation of area within an integrated circuit).

With a view to achieving the aforesaid purpose, the object of the invention is a device for computing the quotient q and remainder r of the division ($y \cdot k_1 + x$)/$k_2$ that presents the characteristics specified in claim 1. Further advantageous characteristics form the subject of the dependent claims.

In various embodiments, instead of a generic multiplier and a generic divider, functions of conversion that can be implemented via look-up tables (LUTs) or simple combinational circuits are present. In various embodiments, the conversion can be performed in two steps.

In a first step, the components x and y are considered independently and at least the component y is translated into the space (q, r), i.e., the number of the logical row y is translated into a logical address ($q_y$, $r_y$). This step can be implemented by a static-conversion function determined via the constant $k_1$ and $k_2$, i.e., the conversion function remains unaltered during normal operation of the circuit, and to the same input there corresponds the same output.

In an embodiment, also the component x, i.e., the number of the logical column x, is translated into a physical address ($q_x$, $r_x$) in the space (q, r). In a second step, the intermediate result ($q_y$, $r_y$) is combined with the number of the column x or the intermediate result ($q_x$, $r_x$) to form the final result (q, r). For example, in an embodiment, the intermediate results ($q_x$, $r_x$) and ($q_y$, $r_y$) are added in a smart way, considering also the effective physical-address space, or else possible conditions of overflow or carry propagation may occur.

In an embodiment, the static tables for the functions of conversion of the components x and y are pre-computed starting from the constant $k_1$ and $k_2$, through a high-level program (e.g., C, Matlab, Tcl, Perl, etc.) that encodes them with a description that can be synthesized and integrated with the block that implements the smart sum of the partial results, encoded with a hardware language (for example, VHDL, Verilog).

Various embodiments can be used, in general, whenever it is desired to compute the quotient q and remainder r of the division:

$$(y \cdot k_1 + x)/k_2 \quad (3)$$

where $k_1$ and $k_2$ are integers and constant, and where x and y are integers.

In various embodiments, this approach can be integrated in software executed by a processor and used for the logical synthesis (i.e., translation of the HDL code into a circuit description), which recognizes Eq. (3) and implements the equation with one of the circuits described herein on the basis, for example, of the specific attributes of performance and/or occupation of area within the integrated circuit.

BRIEF DESCRIPTION OF THE DRAWINGS

The invention will now be described, purely by way of non-limiting example, with reference to the annexed drawings, wherein.

DETAILED DESCRIPTION OF THE PREFERRED EMBODIMENTS

In the ensuing description, various specific details are illustrated and aimed at providing an in-depth understanding of the embodiments. The embodiments can be obtained without one or more of the specific details, or with other methods, components, materials, etc. In other cases, well-known structures, materials, or operations are not illustrated or described in detail so as not to render various aspects of the embodiments obscure.

Reference to "an embodiment" or "one embodiment" in the framework of this description is aimed at indicating that a particular configuration, structure or characteristic described in relation to the embodiment is included in at least one embodiment. Hence, phrases such as "in an embodiment" or "in one embodiment" that may be present in different points of this description do not necessarily refer to one and the same embodiment. Furthermore, particular conformations, structures, or characteristics can be combined in an adequate way in one or more embodiments.

The references used herein are adopted purely for reasons of convenience and hence do not define the sphere of protection or the scope of the embodiments.

In general, the embodiments considered herein are based upon implementations of Eqs. (1) and (2), thus avoiding the use of complex arithmetical blocks. In fact, it is noted that, by exploiting the fact that the parameters $k_1$ and $k_2$ are constant, the conversion can be performed in two steps by rewriting Eq. (3) in the following way:

$$f(x, y) = \frac{y \cdot k_1}{k_2} + \frac{x}{k_2} \quad (4)$$

Figure 3:
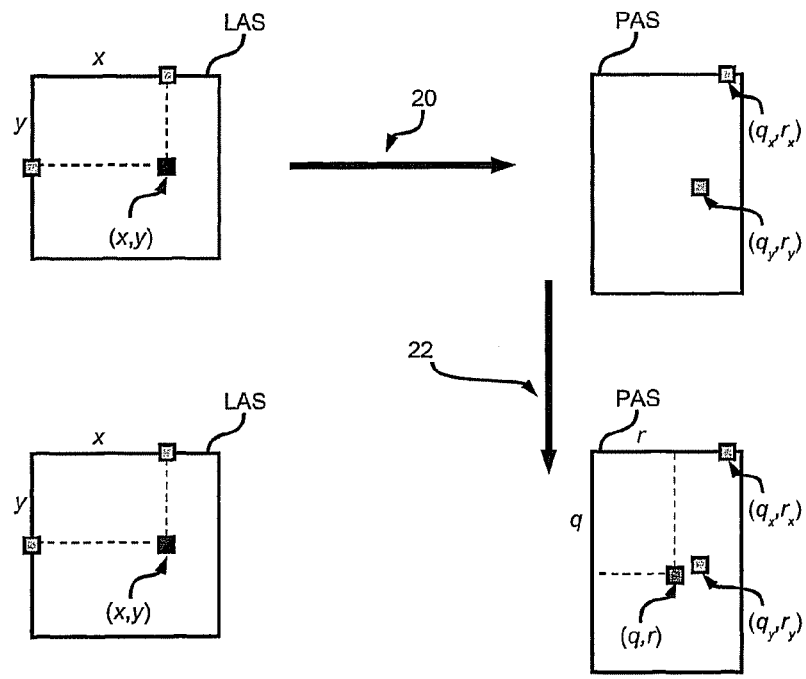
FIGS. 3 to 5 show a first embodiment, in accordance with the present invention.

FIG. 3 shows the general scheme of a possible embodiment of these two steps. In a first step 20, each component is translated into the space (q, r), i.e., the component x is translated into an address $(q_x, r_x)$, and the component y is translated into an address $(q_y, r_y)$. This step can be implemented by a static-conversion function determined by the constants $k_1$ and $k_2$; i.e., the conversion function remains unaltered during normal operation of the circuit and to one and the same input there corresponds the same output.

In a second step 22, these intermediate results $(q_x, r_x)$ and $(q_y, r_y)$ are combined to form the final result (q, r). For example, in an embodiment, these intermediate results $(q_x, r_x)$ and $(q_y, r_y)$ are summed up in a smart way by considering also the effective physical-address space or else possible conditions of overflow or carry propagation.

Instead of a multiplier and/or divider (which are circuits the function of which is intrinsically linked to at least two input data, i.e., at least two factors in the case of the multiplier, and dividend and divisor in the case of the divider) the circuit considered herein envisages functions of conversion of a tabular or combinational type, i.e., functions that can be implemented via look-up tables (LUTs) or simple combinational circuits that, at the circuit level, can be implemented so as to operate as a function of one input datum.

The approach is well suited also for a possible integration thereof within a program that generates, starting from the constant $k_1$ and $k_2$, the description of the circuit, for example in a high-level language (HDL).

Figure 4:
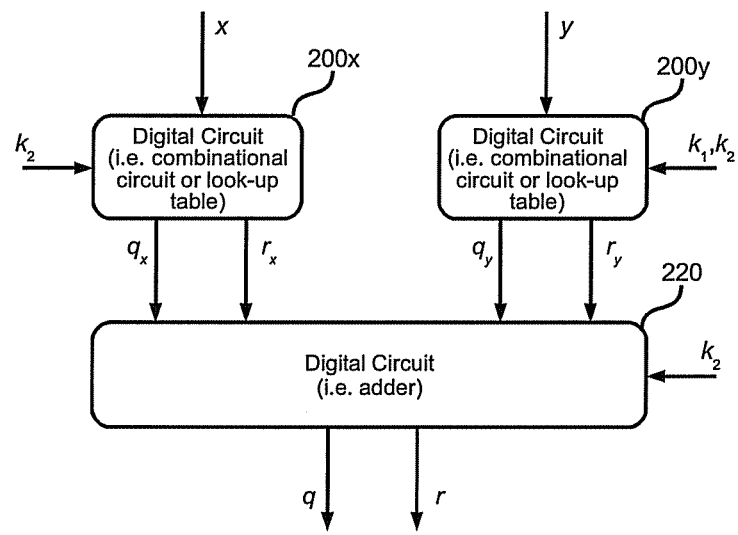

FIG. 4 shows an embodiment of a corresponding conversion circuit. In the embodiment considered, two conversion blocks 200x and 200y are envisaged, which translate the components x and y into the space (q, r). In particular, block 200x translates the component x into an address $(q_x, r_x)$, and block 200y translates the component y into an address $(q_y, r_y)$.

In an embodiment, the functions of conversion implemented within blocks 200x and 200y are pre-computed during modelling of the circuit. For example, a program can generate directly, starting from the parameters $k_1$ and $k_2$, a synthesizable code, for example an HDL code (such as, for example, VERILOG or VHDL) or a logic table. Subsequently, this code can be synthesized for the desired architecture, for example an ASIC, an FPGA or a PLA.

As already anticipated, the conversion is based upon the quotient q and the remainder r of the following function:

$$f(x, y) = \frac{y \cdot k_1}{k_2} + \frac{x}{k_2} \quad (5)$$

i.e., $$y \cdot k_1 + x = q \cdot k_2 + r \quad (6)$$

where Eq. (6) satisfies the congruence relation, where the remainder r is the least of the values that satisfy the relation $$y \cdot k_{1+x=r} (\text{mod } k_2), 0 \leq r < k_2 \quad (7)$$

The first term in Eq. (6) represents the transformation of the space (x, y) into a one-dimensional space; by separating the components x and y it is possible to rewrite the equation for the component y as follows:

$$y \cdot k_1 = q_y \cdot k_2 + r_y, 0 \leq r_y < k_2 \quad (8)$$

$$\frac{y \cdot k_1}{k_2} \to (q_y, r_y) \quad (9)$$

For the application considered herein by way of example, the physical address $(q_y, r_y)$, which represents the start of the logical row y in the physical-address space, is then computed.

The conversion function that translates the component y on $(q_y, r_y)$ and that can be implemented within block 200y is thus based upon constant values and can be pre-computed.

In substantially the same way, we can also rewrite the contribution of the component x as follows:

$$x = q_x \cdot k_2 + r_x, \ 0 \le r_x < k_2 \tag{10}$$

$$\frac{x}{k_2} \to (q_x, r_x) \tag{11}$$

In the embodiment considered herein by way of example, Eq. (11) is implemented within block 200x by means of a second conversion function that translates the component x into $(q_x, r_x)$.

For the application considered herein by way of example, the physical address $(q_x, r_x)$, which represents the offset of the column x, is then computed.

In the embodiment considered, to determine the quotient q and the final remainder r (i.e., the final physical address), in block 220 the partial results $(q_x, r_x)$ and $(q_y, r_y)$ are added (i.e., the offset x and the start of the logical row y represented in the physical-address space).

In an embodiment, block 220 also takes into account, during computation of the final values q and r, the congruence relation of Eq. (7)

$$y \cdot k_1 + x = (q_y + q_x) \cdot k_2 + (r_y + r_x) \tag{12}$$

where $r_y$ and $r_x$ are the partial remainders, and the final remainder r respects the congruence relation:

$$y \cdot k_1 + x \equiv (r_y + r_x) \bmod k_2 \tag{13}$$

The sum $(r_y + r_x)$ may not always represent the minimum value that satisfies this criterion, because $$0 \le (r_y + r_x) < 2 \cdot k_2 \tag{14}$$

In an embodiment, block 220 corrects the final result and implements the following equation:

$$y \cdot k_1 + x = (q_y + q_x + q_{adj}) \cdot k_2 + r \tag{15}$$
where $$q_{adj} = \begin{cases} 0 & 0 \le (r_y + r_x) < k_2 \\ 1 & k_2 \le (r_y + r_x) < 2 \cdot k_2 \end{cases} \tag{16}$$

$$r = \begin{cases} (r_y + r_x), & 0 \le (r_y + r_x) < k_2 \\ (r_y + r_x - k_2), & k_2 \le (r_y + r_x) < 2 \cdot k_2 \end{cases} \tag{17}$$

Figure 5:
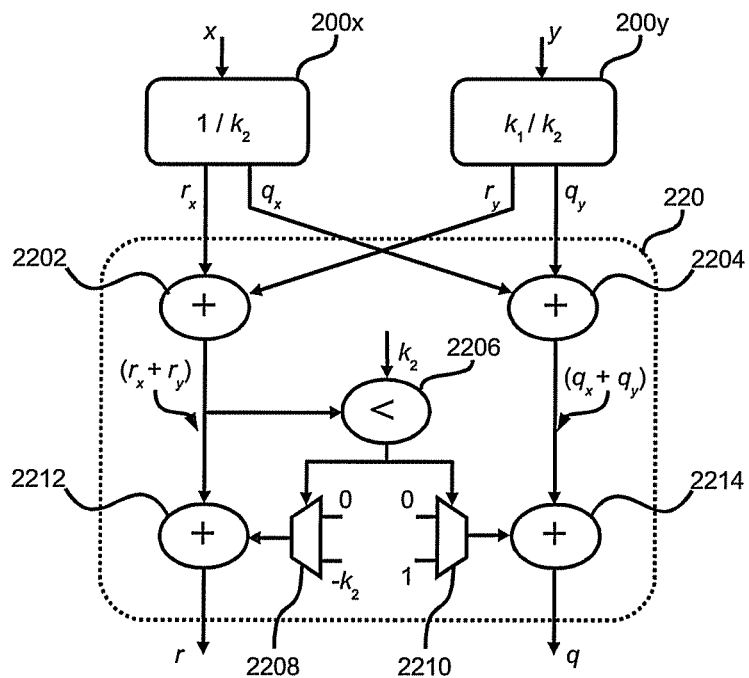

FIG. 5 shows a block diagram of a possible embodiment that implements the conversion of the components x and y, and the combination of the partial results as illustrated in Eqs. (15) to (17).

In the embodiment considered, Eq. (11), i.e., the translation of the component x into the logical-address space $(q_x, r_x)$, is performed via block 200x, which implements the function $(1/k_2)$.

In an embodiment, block 200x is not a generic divider as used in the known art, but a digital circuit, for example a combinational circuit or a look-up table, which implements the function $(1/k_2)$ for the specific value of $k_2$. However, a generic divider could be used. Even though this choice is not usually preferable, in any case a reduction of the circuit complexity is obtained, because a division on a smaller number of bits is used.

In the embodiment considered, block 200y implements Eq. (9), i.e., the translation of the component y into the space $(q_y, r_y)$. Also in this case, block 200y can be implemented via a digital circuit, for example a combinational circuit or a look-up table, which implements the function $(k_1/k_2)$ only for the specific values of $k_1$ and $k_2$. The partial results $(q_x, r_x)$ and $(q_y, r_y)$ are supplied to a block 220 for to form the final result (q, r).

In the embodiment considered, block 220 comprises an adder 2202 for computing the sum $(r_x + r_y)$ and an adder 2204 for computing the sum $(q_x + q_y)$. Next, a check is made to see whether these results are to be corrected as shown with reference to Eqs. (15) to (17). In particular, in the case where the sum $(r_x + r_y)$ is less than $k_2$, the results $(r_x + r_y)$ and $(q_x + q_y)$ remain unaltered; otherwise, they are corrected.

In the embodiment considered, a comparator 2206 verifies whether the sum $(r_x + r_y)$ is less than $k_2$. The result of the verification is given to two multiplexers 2208 and 2210, which yield the respective correction values.

In the embodiment considered, the multiplexer 2208 supplies the value "0" or the value $-k_2$ to an adder 2212 for computing the final remainder r, and the multiplexer 2210 supplies the value "0" or the value "1" to an adder (incrementer) 2214 for computing the final quotient q.

The embodiment shown in FIG. 5 thus comprises simple digital blocks, which enable reduction of occupation of area within the integrated circuit and/or improvement of the performance of the circuit.

Figure 6:
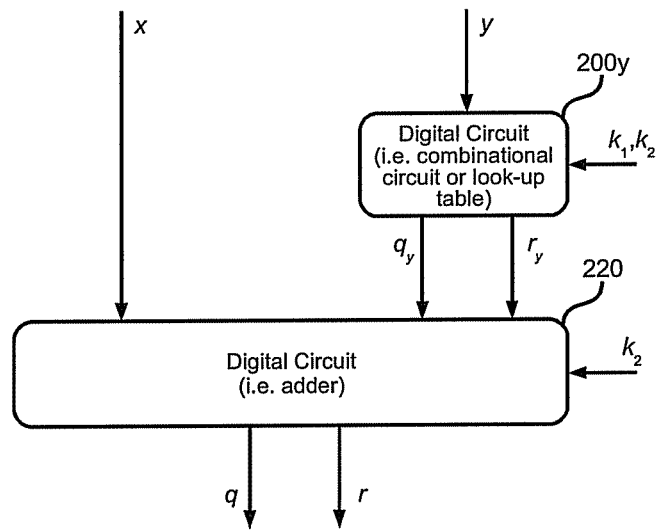
FIGS. 6 and 7 show a second embodiment in accordance with the present invention.

FIG. 6 shows a second embodiment that does not use block 200x for conversion of the component x. In this embodiment, the component (i.e., the offset) x is combined directly with the partial remainder $r_y$ within block 220.

As shown with reference to Eq. (10), the partial remainder $r_x$ can be computed as:

$$r_x = x - (q_x \cdot k_2) \tag{18}$$

This means that the remainder $r_x$ of the division $(x/k_2)$ results from the subtraction of $q_x$ times $k_2$ from the value of x, where the number of the possible values of $q_x$ depends upon the ratio between the constant $k_1$ and $k_2$, also referred to as column ratio in the case of conversion of physical and logical addresses:

$$CR = \text{quotient}(k_1/k_2)$$

where $k_1$ is the maximum value of x, i.e., the number of the logical columns, and $k_2$ is the maximum value of r, i.e., the number of the physical columns. The ratio CR is typically less than 5-10.

Starting from Eq. (8), we can thus write:

$$y \cdot k_1 + x = (q_y \cdot k_2 + r_y) + x \tag{19}$$

where $0 \le x/k_2 < CR$ and $0 \le r_y < k_2$ (property of the remainder).

Also in this case, the limits of the final remainder r are taken into account because in general the following relations apply:

$$y \cdot k_1 + x = (q_y \cdot k_2) + (r_y + x) \tag{20}$$

$$0 \le r_y + x < k_2(CR+1) \tag{21}$$

Also in this embodiment, block 220 hence corrects the partial results. For example, block 220 can determine the quotient q and the remainder r, i.e., the final physical address (q, r), on the basis of the following relations:

$$y \cdot k_1 + x = (q_y + q_{adj}) \cdot k_2 + r \tag{22}$$
where $$q_{adj} = \begin{cases} 0 & 0 \le r_y + x < k_2 \\ 1 & k_2 \le r_y + x < 2 \cdot k_2 \\ \vdots & \vdots \\ CR & CR \cdot k_2 \le r_y + x < (CR+1) \cdot k_2 \end{cases} \tag{23}$$

$$r = \begin{cases} r_y + x & 0 \le r_y + x < k_2 \\ r_y + x - k_2 & k_2 \le r_y + x < 2 \cdot k_2 \\ \vdots & \\ r_y + x - CR \cdot k_2 & CR \cdot k_2 \le r_y + x < (CR+1) \cdot k_2 \end{cases} \quad (24)$$

Figure 7:
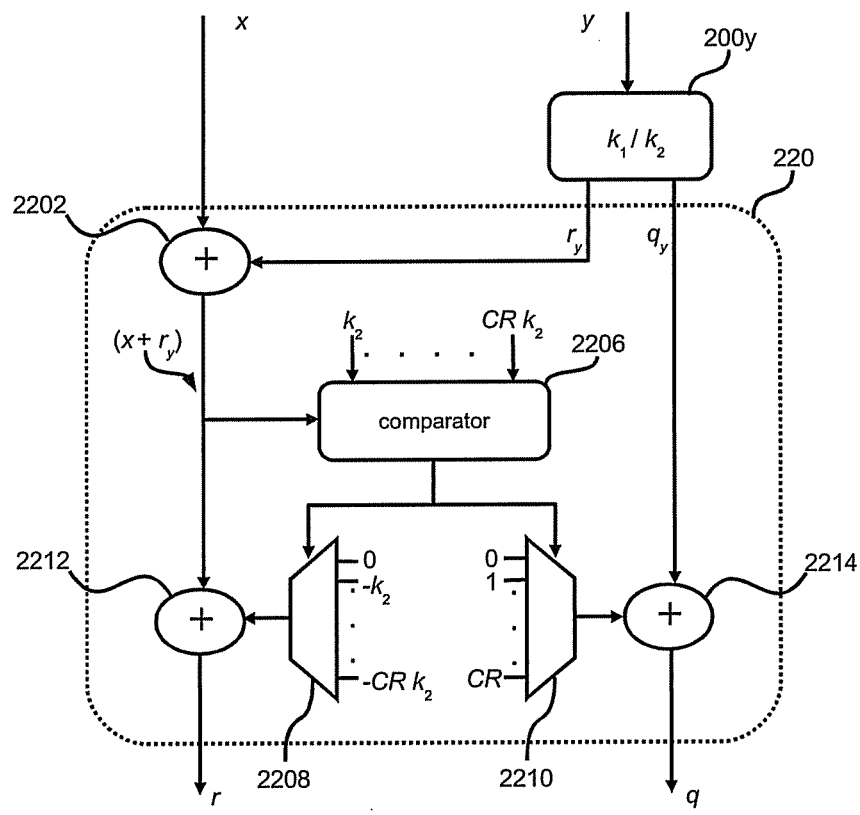

FIG. 7 shows a block diagram of a possible circuit that implements Eqs. (22) to (24). Also in this case, block 200y implements Eq. (9), i.e., the translation of the component y into the logical-address space ($q_y$, $r_y$).

In this embodiment, block 200x is not envisaged, and block 220 receives the partial result ($q_y$, $r_y$) and the component x directly to form the final result (q, r).

In the embodiment considered, block 220 comprises an adder 2202 for computing the sum ($r_y+x$), and then a check is made to see whether the results need to be corrected, as shown with reference to Eqs. (22) to (24).

In the embodiment considered, said check is implemented via a comparator 2206 that verifies whether the sum ($r_y+x$) lies in one of the intervals [0;$k_2$[, [$k_2$;2·$k_2$[, . . . , [CR·$k_2$; (CR+1)·$k_2$[. The result of the check is given to two multiplexers 2208 and 2210, which yield the respective correction values. In particular, the multiplexer 2208 supplies the respective correction value selected from among "0", $-k_2$, . . . , $-CR·k_2$ to an adder 2212 for computing the final remainder r, and the multiplexer 2210 supplies the respective correction value selected from among "0", "1", . . . , CR to an adder 2214 for computing the final quotient q.

This embodiment does hence not require the conversion block 200x and the adder 2204. However, the control circuit, i.e., the comparator 2206 and the multiplexers 2208 and 2210, are more complex. In fact, this approach usually occupies less area if the parameter CR is less than 5.

The circuits described herein hence compute the quotient q and remainder r of the division ($y·k_1+x$)/$k_2$ substantially via three functional blocks. The first circuit, i.e., block 200y, computes the quotient $q_y$ and the remainder $r_y$ of the function $y·k_1/k_2$ via a static-conversion function by exploiting the fact that the parameters $k_1$ and $k_2$ are constant.

The second circuit computes the remainder r of the division. In particular, this circuit combines the partial remainder $r_y$ with the parameter x, and verifies whether the result of the combination is to be corrected.

In the second embodiment (FIG. 7) the adder 2202 combines the partial remainder $r_y$ directly with the parameter x, block 2206 verifies the result of the combination x+$r_y$, and the adder 2212 together with the multiplexer 2208 correct the result.

Instead, in the first embodiment (FIG. 5) the combination of the partial remainder $r_y$ with the parameter x is made in two steps, i.e., via block 220x and the adder 2202. This enables reduction both of the part of the checks made via block 2206 and of the part of the correction made via blocks 2208 and 2212, because block 200x guarantees that the result of the combination $r_x+r_y$ is always less than 2 $k_2$.

Finally, the third circuit computes the quotient q of the division. In particular, the third circuit corrects the quotient $q_y$ if the verification made by the second circuit indicates that also the remainder has been corrected.

In the second embodiment (FIG. 7), the correction is performed via the adder 2214 and the multiplexer 2210, which yields the overflow number of the sum x+$r_y$ with respect to the maximum value $k_2$.

Instead, in the first embodiment (FIG. 5) the correction of the partial quotient $q_y$ is made in two steps, i.e., via the adder 2204 and the adder (incrementer) 2214. The first adder 2204 corrects the contribution of the component x—i.e., it adds the value of $q_x$ supplied by block 200x—, whereas the second adder 2214 corrects the possible "overflow" of the sum $r_x+r_y$ with respect to the maximum value $k_2$ supplied by the multiplexer 2210.

Figure 1:
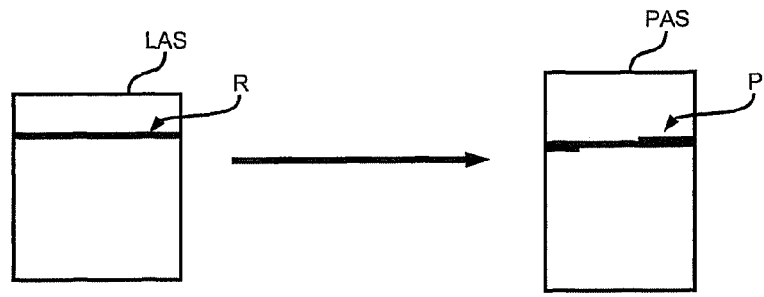
FIGS. 1 and 2 represent the prior art.
Figure 2:
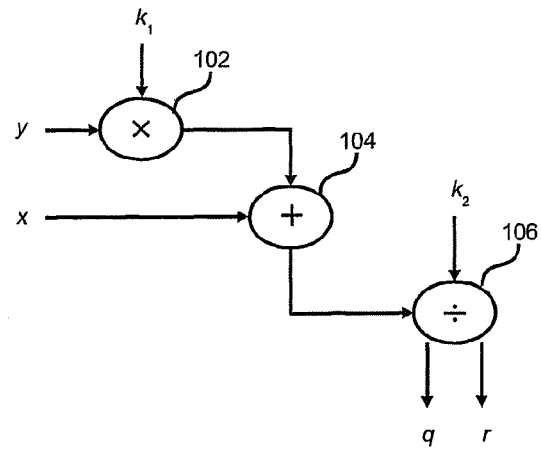

The circuits shown in FIGS. 5 and 7 have been used to carry out a conversion of different logical-address spaces and physical-address spaces, for example from 162×132 to 480× 48, from 220×176 to 480×82, and from 320×240 to 480×160. In general, it has been possible to obtain a reduction of occupation of area within the integrated circuit (typically between 50% and 80%) as compared to the solution shown in FIG. 2. The circuits described herein are also considerably faster, enabling the use of the conversion modules also in applications with high clock frequency (typically three or four times faster than the solution shown in FIG. 2).

The circuit shown in FIG. 7 typically occupies less area than the circuit shown in FIG. 5 even though the circuit shown in FIG. 5 is typically faster.

Of course, without prejudice to the principle of the invention, the details of implementation and the embodiments may vary widely with respect to what has been described and illustrated herein purely by way of example, without thereby departing from the scope of the present invention, as defined by the ensuing claims.

That which is claimed:

1. A device for calculating a quotient q and a remainder r of a division ($y·k_1+x$)/$k_2$ wherein $k_1$ and $k_2$ are constants, and wherein x and y are integers, the device comprising:
    a first digital circuit configured to receive as input values of y to identify, via a static conversion function, corresponding values of a quotient $q_y$ and a remainder $r_y$ of $y·k_1/k_2$,
    a second digital circuit configured to calculate the remainder r of the division by at least
        calculating a combined value ($r_x+r_y$; x+$r_y$) of the remainder $r_y$ and x,
        verifying if the combined value ($r_x+r_y$; x+$r_y$) is less than $k_2$,
        correcting the combined value ($r_x+r_y$; x+$r_y$) if the verification indicates that the combined value ($r_x+r_y$; x+$r_y$) is not less than $k_2$, and
        assigning the corrected combined value ($r_x+r_y$; x+$r_y$) to the remainder r; and
    a third digital circuit configured to calculate the quotient q of the division, by at least
        correcting the quotient $q_y$ if the verification indicates that the combined value ($r_x+r_y$; x+$r_y$) is not less than $k_2$, and
        assigning the corrected quotient $q_y$ to the quotient q.

2. The device of claim 1, wherein the second digital circuit comprises:
    a fourth digital circuit configured to receive as input values of x and to identify, via a static conversion function, corresponding values of a quotient $q_x$ and a remainder $r_x$ of the function $x·1/k_2$; and
    a first adder configured to calculate a combined value ($r_x+r_y$) as sum of the remainder $r_y$ and the remainder $r_x$.

3. The device of claim 2, wherein the second digital circuit further comprises:
    a comparator configured to verify if the combined value ($r_x+r_y$) is less than $k_2$;
    a first multiplexer configured to provide a first correction value between 0 and $-k_2$ as a function of the verification by the comparator; and a second adder configured to calculate the remainder r as a sum of the first correction value and the combined value $(r_x+r_y)$.

4. The device of claim 3, wherein the third digital circuit comprises:
   a second multiplexer configured to provide a second correction value between 0 and 1 as a function of the verification of the comparator; and
   a third adder configured to calculate the quotient q as a sum of the second correction value, the quotient $q_y$, and the quotient $q_x$.

5. The device of claim 1, wherein the second digital circuit comprises:
   a first adder configured to calculate a combined value $(x+r_y)$ as sum of the remainder $r_y$, x.

6. The device of claim 5, wherein the second digital circuit comprises:
   a comparison module configured to verify if the combined value $(x+r_y)$ is in an interval $[0;k_2]$, $[k_2;2\cdot k_2]$, . . . , $[CR\cdot k_2;(CR+1)\cdot k_2]$, wherein CR=quotient$(k_1/k_2)$ is a ratio between the constants $k_1$ e $k_2$;
   a first multiplexer configured to provide a first correction value selected among 0, $-k_2$, . . . , $-CR\cdot k_2$ as a function of the verification of the comparison module; and
   a second adder configured to calculate the remainder r as sum of the first correction value and the combined value $(x+r_y)$.

7. The device of claim 6, wherein the third digital circuit comprises:
   a second multiplexer configured to provide a second correction value selected among 0, 1, . . . , CR as a function of the verification of the comparison module; and
   a third adder configured to calculate the quotient q as sum of the second correction value and the quotient $q_y$.

8. The device of claim 1, wherein the first digital circuit is at least one of a combinational circuit and a look-up table, which assigns to each input value of y a quotient $q_y$ and remainder $r_y$ of a function $y\cdot k_1/k_2$.

9. The device of claim 2, wherein the fourth digital circuit is at least one of a combinational circuit and a look-up table, which assigns to each input value of x a specific quotient $q_x$ and remainder $r_x$ of a function $x\cdot 1/k_2$.

10. The device of claim 1, wherein $k_1$ is a number of logical columns, $k_2$ is a number of physical columns, y is a number of a logical row, x is a number of a logical column, q is a number of a physical row and r is a number of a physical column.

11. A device for calculating a quotient q and a remainder r of a division $(y\cdot k_1+x)/k_2$, wherein $k_1$ and $k_2$ are constants, and wherein x and y are integers, wherein $k_1$ is a number of logical columns, $k_2$ is a number of physical columns, y is a number of a logical row, x is a number of a logical column, q is a number of a physical row and r is a number of a physical column, the device comprising:
   a first digital circuit configured to receive as input values of y to identify, via a static conversion function, corresponding values of a quotient $q_y$ and a remainder $r_y$ of $y\cdot k_1/k_2$;
   a second digital circuit configured to calculate the remainder r of the division by at least
      calculating a combined value $(r_x+r_y; x+r_y)$ of the remainder $r_y$ and x,
      verifying if the combined value $(r_x+r_y; x+r_y)$ is less than $k_2$,
      correcting the combined value $(r_x+r_y; x+r_y)$ if the verification indicates that the combined value $(r_x+r_y; x+r_y)$ is not less than $k_2$, and
      assigning the corrected combined value $(r_x+r_y; x+r_y)$ to the remainder r;
   the second digital circuit comprising a first adder configured to calculate a combined value $(x+r_y)$ as sum of the remainder $r_y$ and x; and
   a third digital circuit configured to calculate the quotient q of the division by at least
      correcting the quotient $q_y$ if the verification indicates that the combined value $(r_x+r_y; x+r_y)$ is not less than $k_2$, and
      assigning the corrected quotient $q_y$ to the quotient q.

12. The device of claim 11, wherein the second digital circuit comprises:
   a fourth digital circuit configured to receive as input values of x and to identify, via a static conversion function, corresponding values of a quotient $q_x$ and a remainder $r_x$ of the function $x\cdot 1/k_2$; and
   a first adder configured to calculate a combined value $(r_x+r_y)$ as sum of the remainder $r_y$ and the remainder $r_x$.

13. The device of claim 12, wherein the second digital circuit further comprises:
   a comparator configured to verify if the combined value $(r_x+r_y)$ is less than $k_2$;
   a first multiplexer configured to provide a first correction value between 0 and $-k_2$ as a function of the verification by the comparator; and
   a second adder configured to calculate the remainder r as a sum of the first correction value and the combined value $(r_x+r_y)$.

14. The device of claim 13, wherein the third digital circuit comprises:
   a second multiplexer configured to provide a second correction value between 0 and 1 as a function of the verification of the comparator; and
   a third adder configured to calculate the quotient q as a sum of the second correction value, the quotient $q_y$, and the quotient $q_x$.

15. A method of using a device for calculating a quotient q and a remainder r of a division $(y\cdot k_1+x)/k_2$, wherein $k_1$ and $k_2$ are constants, and wherein x and y are integers, the method comprising:
   receiving, at a first digital circuit, input values of y for identifying, via a static conversion function, corresponding values of a quotient $q_y$ and a remainder $r_y$ of $y\cdot k_1/k_2$;
   calculating the remainder r of the division using a second digital circuit configured to
      calculate a combined value $(r_x+r_y; x+r_y)$ of the remainder $r_y$ and x,
      verify if the combined value $(r_x+r_y; x+r_y)$ is less than $k_2$,
      correct the combined value $(r_x+r_y; x+r_y)$ if the verification indicates that the combined value $(r_x+r_y; x+r_y)$ is not less than $k_2$, and
      assign the corrected combined value $(r_x+r_y; x+r_y)$ to the remainder r; and
   calculating the quotient q of the division using a third digital circuit configured to
      correct the quotient $q_y$ if the verification indicates that the combined value $(r_x+r_y; x+r_y)$ is not less than $k_2$, and
      assign the corrected quotient $q_y$ to the quotient q.

16. The method of claim 15, wherein the second digital circuit comprises:
   a fourth digital circuit configured for receiving, as input values of x and to identify, via a static conversion function, corresponding values of a quotient $q_x$ and a remainder $r_x$ of the function $x\cdot 1/k_2$; and a first adder configured for calculating a combined value $(r_x+r_y)$ as sum of the remainder $r_y$ and the remainder $r_x$.

17. The method of claim 1, wherein the second digital circuit further comprises:
    a comparator configured for verifing if the combined value $(r_x+r_y)$ is less than $k_2$;
    a first multiplexer configured for providing a first correction value between 0 and $-k_2$ as a function of the verification by the comparator; and
    a second adder configured for calculating the remainder r as a sum of the first correction value and the combined value $(r_x+r_y)$.

18. The device of claim 13, wherein the third digital circuit comprises:
    a second multiplexer configured for providing a second correction value between 0 and 1 as a function of the verification of the comparator; and
    a third adder configured for calculating the quotient q as a sum of the second correction value, the quotient $q_y$ and the quotient $q_x$.

* * * * *

UNITED STATES PATENT AND TRADEMARK OFFICE
CERTIFICATE OF CORRECTION

PATENT NO. : 8,527,573 B2
APPLICATION NO. : 12/876329
DATED : September 3, 2013
INVENTOR(S) : Dondini et al.

It is certified that error appears in the above-identified patent and that said Letters Patent is hereby corrected as shown below:

In the Claims

Column 9, Line 16　　　　　Delete: "$(x+r_y)$ as sum of the remainder $r_yx$."
Claim 5　　　　　　　　　　Insert: --$(x+r_y)$ as sum of the remainder $r_y$ and x.--

Column 11, Line 3　　　　　Delete: "The method of claim 1, wherein the second digital"
Claim 17　　　　　　　　　　Insert: --The method of claim 12, wherein the second digital--

Signed and Sealed this
Third Day of June, 2014

Michelle K. Lee
*Deputy Director of the United States Patent and Trademark Office*